J. GARDNER AND C. Y. KNIGHT.
TOOL FOR SLOTTING COMMUTATORS.
APPLICATION FILED JAN. 29, 1920.

1,366,784.

Patented Jan. 25, 1921.

Inventors.
Joseph Gardner and
Cecil Young Knight.
by Wilkinson & Fiusta
Attorneys.

UNITED STATES PATENT OFFICE.

JOSEPH GARDNER AND CECIL YOUNG KNIGHT, OF LONDON, ENGLAND; SAID GARDNER ASSIGNOR TO SAID KNIGHT.

TOOL FOR SLOTTING COMMUTATORS.

1,366,784.  Specification of Letters Patent.  Patented Jan. 25, 1921.

Application filed January 29, 1920. Serial No. 354,986.

*To all whom it may concern:*

Be it known that we, JOSEPH GARDNER and CECIL YOUNG KNIGHT, subjects of the King of England, and both residing in London, England, have invented certain new and useful Improvements in Tools for Slotting Commutators, of which the following is a specification.

This invention relates to tools for slotting commutators—that is to say, for cutting down the mica or other insulating material between the segments when, as the result of wear, it projects above the surface of the copper segments.

An important object of the invention is to provide a manually operated tool which can be readily used for slotting commutators of various diameters and having segments of various widths.

According to this invention a hand device for use in slotting commutators comprises a cutter, such for example as a saw-blade, and a guide-blade so spaced and secured in parallel relation thereto that it can enter a previously cleared slot and sliding therein act as a guide for the cutter in clearing another slot.

Preferably the cutter and the guide-blade are adjustable toward or away from one another in a direction at right-angles to their length, in order that they may accommodate different widths of commutator segment. Preferably, also, the cutter itself is adjustable in a direction radial to the commutator when it is in the cutting position thereon, in order that the depth of cut may be varied.

According to another feature of the invention there is provided another guide adjustable on the stock of the tool or device so as to bear on the periphery of the commutator at a point spaced angularly apart from the guide-blade and cutter. Preferably this guide is arranged on that side of the cutter which is remote from the guide-blade, and it is used to maintain the guide-blade and cutter radial to the commutator when in use.

The invention consists in the construction, arrangement and combination of parts described hereinafter and pointed out in the claims.

One embodiment of this invention is illustrated by way of example in the accompanying drawings, wherein:—

Like reference characters indicate like parts in both the figures.

Figure 1:
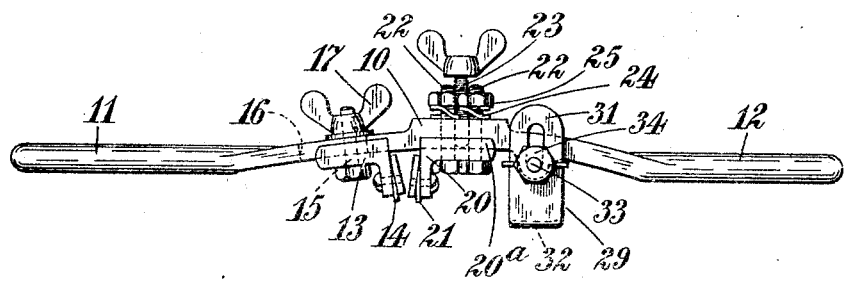
Figure 1 is a side elevation.

The device comprises a stock 10 formed with a handle 11, 12 at each end, being somewhat similar to a spoke-shave. Preferably the stock 10 is curved as shown in Fig. 1, for the purpose hereinafter described.

On the stock 10 there is mounted a clamp or carrier 13 in which is secured a guide-blade 14. This blade is arranged to lie transversely of the length of the stock 10 and in a plane normal or approximately normal to the curved part of the stock. The carrier 13 is secured to the stock 10 by a bolt 15 passing through a slot 16 and secured by a wing-nut 17 or other convenient means. The slot 16 extends longitudinally of the stock 10 to enable the position of the carrier, and therefore of the guide-blade, to be adjusted for various widths of commutator segment.

A second clamp or carrier 20 is provided on the stock 10 to support a saw-blade 21 or other cutting-device. The saw-blade 21 is set with the line of its teeth parallel with the lower edge of the guide-blade 14, but the two parts 14 and 21 are inclined to one another, as shown in Fig. 1, so as to be radial or approximately so to the commutator on which they are to work. This inclination is obtained, in the construction illustrated, by the curvature of the stock 10, but it could if desired, be obtained by suitably shaping the carriers 13 and 20.

Figure 2:
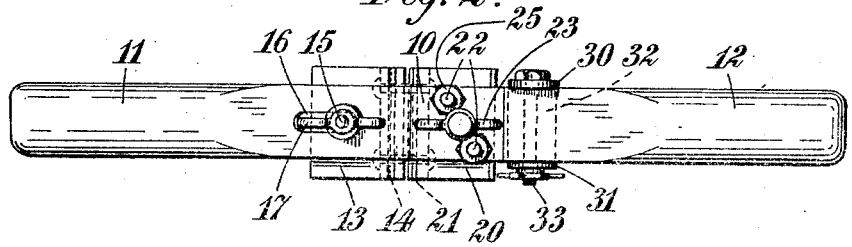
Fig. 2 is a plan of a complete tool according to the invention.

The carrier 20 is secured on the stock 10 by means of two bolts 22 which are arranged with their heads below the carrier and extend through the carrier and stock 10 and are fitted at their upper ends with stiff spring-washers 24 and nuts 25. The screws 22 are arranged, as shown in Fig. 2, diagonally of the carrier and stock. A set-screw 23 is screwed into the stock 10 and passes through it to engage the upper face of the carrier 20 so that the carrier 20 and cutter 21 is pressed forward against the action of the spring-washers 24. With this construction the adjustment of the cutter for varying the depth of cut, that is to say its adjustment toward and away from the stock 10, is easily effected without disturbing the parallel setting of the cutter with the guide-blade. This parallel relationship is maintained by the above mentioned positioning of the bolts 22, and also by upstanding flanges 20ª on the carrier 20 engaging the sides of the stock 10. It will be seen that the use of the spring-washers 24 on the two bolts 22 permits of the respective tensions being adjusted so that a single set-screw 23 will feed the cutter 21 forward in a direction always parallel to itself.

An auxiliary guide 29 is secured on the stock 10 of the tool, and it is conveniently constituted by a U-shaped member whereof arms 30, 31 lie one on each side of the stock and a connecting-piece 32 is situated on the same side of the stock as the guide-blade 14 and cutter 21. The arms 30, 31 are preferably slotted and a bolt 33 extending through the arms, and preferably also through a suitable hole in the stock, is provided with a wing-nut 34 as shown, so that it may be tightened up to grip the arms 30, 31 on the stock and thereby hold the auxiliary guide 29 in any position to which it may be adjusted. It will be seen that this guide is adjustable in a plane at right-angles to the length of the guide-blade and cutter, this plane also containing the length of the stock.

The object of this auxiliary guide 29 is to provide an additional support for the tool to maintain the cutter in the desired position with respect to the slot in which it is to operate. Assuming that one slot has been cleared, the guide-blade 14 is placed therein, and the cutter 21 lies above the next slot. The auxiliary guide 29 is then adjusted so that it bears on the periphery of the commutator at a point spaced away angularly from the slot which is to be cleared, the setting being such that the cutter 21 is maintained in the desired position radial to the commutator when the guide 32 is in contact with the commutator. The use of the tool is thereby facilitated, for the cutter 21 will always be maintained in its radial position.

As explained above it is desirable that the guide-blade 14 and cutter 21 should be inclined to one another so as to be radial to the commutator on which they are working. This setting is obtained, in the construction illustrated, by the curvature of the stock in the form of a yoke, and it is found in practice that any particular yoke can be used with commutators of different diameters, since the cutter need only be approximately radial to it; the result is that only, say, three stocks having different curvatures need be provided to cover all sizes of commutator that are likely to be met with.

What we claim as our invention and desire to secure by Letters Patent is:—

1. In a manual device for use in slotting commutators, the combination with a support, and a slot-cutter mounted thereon with means for varying the depth of the cut made by said cutter, of a guide that is shaped to enter a slot cut by the said cutter and is mounted on the support in such spaced relation to the cutter as corresponds to the width of the segments of the commutator in which the slots are to be cut.

2. In a manual device for use in slotting commutators, the combination with a support, and a slot-cutter mounted thereon with means for varying the depth of the cut made by said cutter, of a guide that is shaped to enter a slot cut by said cutter and is adjustably mounted on the support in such spaced relation to the cutter as corresponds to the width of the segments of the commutator in which the slots are to be cut.

3. In a manual device for use in slotting commutators, the combination with a longitudinal support, of a slot-cutter carried thereby and adjustable along the same with means for varying the depth of the cut made by said cutter, and a guide that is shaped to enter a slot cut by the said cutter and is mounted on the support in spaced relation to the cutter.

4. In a manual device for use in slotting commutators, the combination with a support, of a slot-cutter mounted thereon with means for varying the depth of the cut made by said cutter, and a guide that is shaped to enter a slot cut by the said cutter and is mounted on the support, which cutter and guide are both adjustable on the support, in a direction transverse to the direction of the cutting movement of the cutter.

5. In a manual device for use in slotting commutators, the combination with a support, of a saw-blade mounted thereon with means for varying the depth of the cut made by said saw blade, and a guide that is shaped to enter a slot cut by the said saw-blade and is mounted on the support in such spaced relation to the saw-blade as corresponds to the width of the segments of the commutator in which the slots are to be cut.

6. In a manual device for use in slotting commutators, the combination with a support, and a slot-cutter mounted thereon with means for varying the depth of the cut made by said cutter, of a guide-blade that is of a thickness to enter a slot cut by the cutter and is mounted on the support in such spaced relation to the cutter as corresponds to the width of the segments of the commutator in which the slots are to be cut.

7. In a manual device for use in slotting commutators, the combination with a support, of a saw-blade mounted thereon with means for varying the depth of the cut made by said saw blade, and a guide-blade that is of a thickness to enter a slot cut by the said saw-blade and is mounted on the support in such spaced relation to the said saw-blade as corresponds to the width of the segments of the commutator in which the slots are to be cut.

8. In a manual device for use in slotting commutators, the combination with a stock, of a saw-blade that is mounted transversely thereon with means for varying the depth of the cut made by said saw blade, and a guide-blade that is of a thickness to enter a slot cut by the said saw-blade and is mounted parallel with the cutting edge of the latter on said stock, which saw-blade and guide-blade are adjustable one relative to the other along the stock, for the purpose specified.

9. In a manual device for use in slotting commutators, the combination with a support, of a slot-cutter carried thereby with means for varying the in and out movement of the slot cutter whereby the depth of the slot may be varied, and a guide that is shaped to enter a slot cut by the said cutter and is mounted on the support in such spaced relation to the cutter as corresponds to the width of the segments of the commutator in which the slots are to be cut.

10. In a manual device for use in slotting commutators, the combination with a stock, of two carriers mounted thereon in adjustable spaced relation one relatively to the other, a saw-blade carried by one of said carriers, means for moving the carrier carrying the saw blade whereby the depth of the cut may be varied, and a guide-blade that is mounted parallel with the cutting edge of the said saw-blade on the other of said carriers and is of a thickness to enter a slot cut by the said saw-blade.

11. In a manual device for use in slotting commutators, the combination with a support, of two guides mounted thereon and directed transversely thereof, a slot-cutter guided by said guides, a spring tending to press the cutter against the support, an adjusting screw mounted in said support and arranged to drive the slot-cutter away therefrom, and a guide that is shaped to enter a slot cut by the said cutter and is mounted on the support in such spaced relation to the cutter as corresponds to the width of the segments of the commutator in which the slots are to be cut, for the purpose specified.

12. In a manual device for use in slotting commutators, the combination with a support, and a slot-cutter mounted thereon with means for varying the depth of the cut made by said cutter, of a guide that is shaped to enter a slot cut by the said cutter and is mounted on the support in such spaced relation to the cutter as corresponds to the width of the segments of the commutator in which the slots are to be cut, and an auxiliary guide mounted on said support, for the purpose specified.

13. In a manual device for use in slotting commutators, the combination with a support, and a slot-cutter mounted thereon with means for varying the depth of the cut made by said cutter, of a guide that is shaped to enter a slot cut by the said cutter and is mounted on the support in such spaced relation to the cutter as corresponds to the width of the segments of the commutator in which the slots are to be cut, and an auxiliary guide mounted on said support on the side of said cutter remote from the former guide, for the purpose specified.

14. In a manual device for use in slotting commutators, the combination with a support in the form of a yoke having a curved middle portion, of a slot-cutter mounted on the said curved portion with means for varying the depth of the cut made by said slot cutter, and a guide that is shaped to enter a slot cut by the said cutter and is mounted on the said curved portion in such spaced relation to the cutter as corresponds to the width of the segments of a commutator in which the slots are to be cut, for the purpose specified.

In testimony whereof we have signed our names to this specification in the presence of two subscribing witnesses.

JOSEPH GARDNER.
CECIL YOUNG KNIGHT.

Witnesses:
 HARRY O. WOLF,
 JAMES L. MIDDLETON.